United States Patent [19]

Yada

[11] Patent Number: 5,389,423
[45] Date of Patent: Feb. 14, 1995

[54] WINDSHIELD MOLDING FOR VEHICLES

[75] Inventor: Yukihiko Yada, Nagoya, Japan

[73] Assignee: Tokai Kogyo Kabushiki Kaisha, Ohbu, Japan

[21] Appl. No.: 890,158

[22] Filed: May 29, 1992

[30] Foreign Application Priority Data

May 31, 1991 [JP] Japan .................. 3-157580

[51] Int. Cl.6 .......................... B32B 3/28; B60J 1/02
[52] U.S. Cl. ..................... 428/167; 428/122; 428/172; 428/192; 428/213; 296/93
[58] Field of Search ................ 428/156, 167, 172, 31, 428/122, 192, 213, 195, 542.2; 296/93, 201; 49/408, 502; 52/209

[56] References Cited

U.S. PATENT DOCUMENTS

| 4,534,724 | 8/1985 | Fischer et al. | 425/295 |
| 4,576,773 | 3/1986 | Azzola et al. | 264/167 |
| 4,584,150 | 4/1986 | Ballocca | 264/40.1 |
| 4,757,659 | 7/1988 | Miyakawa et al. | 52/400 |
| 4,765,936 | 8/1988 | Ballocca | 264/46.1 |
| 4,865,796 | 9/1989 | Tamura et al. | 264/40.7 |
| 4,968,543 | 11/1990 | Fujioka et al. | 428/31 |
| 4,984,839 | 1/1991 | Miyakawa et al. | 296/93 |
| 5,061,335 | 10/1991 | Tamura et al. | 156/244.11 |
| 5,104,173 | 4/1992 | Tamura et al. | 296/93 |
| 5,149,168 | 9/1992 | Yada et al. | 296/201 |
| 5,248,542 | 9/1993 | Hinzpeter et al. | 428/192 |

FOREIGN PATENT DOCUMENTS

| 51-35727 | 10/1976 | Japan . |
| 57-67873 | 4/1982 | Japan . |
| 57-139422 | 8/1982 | Japan . |
| 59-137213 | 8/1984 | Japan . |
| 59-145414 | 9/1984 | Japan . |
| 59-52060 | 12/1984 | Japan . |
| 63-4712 | 1/1988 | Japan . |
| 1195032 | 8/1989 | Japan . |
| 3128721 | 5/1991 | Japan . |

Primary Examiner—Donald J. Loney
Attorney, Agent, or Firm—Oblon, Spivak, McClelland, Maier & Neustadt

[57] ABSTRACT

This invention enables execution of the continuous extrusion-molding of a windshield molding provided with a rainwater drainage groove with sufficient rainwater retaining function simply and satisfactorily. The windshield molding comprises a decorative section of an upper molding section of the entire windshield to be installed throughout the upper section and both of the side sections of the windshield glass extended externally and provided with a rainwater retaining groove in the extended thick body portion. All of the molding sections including the upper molding section, the side molding sections, etc. are continuously extrusion-molded.

12 Claims, 9 Drawing Sheets

WINDSHIELD MOLDING FOR VEHICLES

BACKGROUND OF THE INVENTION

1. Field of the Invention

This invention relates to a windshield molding for vehicles which is to be installed to seal the gap between the periphery of the windshield glass installed to various types of vehicles such as automobiles and the vehicle body panel, and the production method thereof.

2. Description of the Related Art

In general, windshield moldings are installed to the periphery of the windshield glass inserted into the window opening in the vehicle body panel.

In actual application, the windshield molding extrusion molded in a long length is inserted into the long continuous gap between the periphery of the windshield glass and the edge of the window opening in the vehicle body panel to seal the gap.

The windshield molding is inserted and fastened directly to the vehicle body panel or fixed by fasteners mounted on the vehicle body panel.

Regarding the windshield moldings for automobiles, articles provided with recessed grooves at the section located to the upper side of the windshield glass for the purpose of intercepting rainwater which has fallen on the roof panel from running down onto the surface of the windshield glass have been previously proposed, such as those described in Japanese Patent Gazette No. 35727/1976, Japanese Utility Model Laid-Open Publication No. 67873/1982, No. 139422/1982 and No. 145414/1984.

Nevertheless, these conventional windshield moldings provided with rainwater retaining grooves in the upper molding section either comprise groove sections made of a different component from the molding proper or consist of the upper molding section independently molded with a different cross-section from the side molding sections, such an upper molding section being connected to the side molding sections using joints.

Consequently, under conventional techniques, providing the upper section with the rainwater retaining grooves inevitably increases the number of component parts and complicates the mounting structure of the moldings.

The windshield molding as described in Japanese Patent Laid-Open Publication No. 195032/1989 consists of a molding extrusion which is molded with a constant cross-sectional shape inclusive of a groove-shape and wherein the groove section is cut away where such groove is unnecessary. In this way, both upper molding and side molding sections are molded together in one piece.

Nevertheless, with this article, a sharp edge remains on the decorative part of the molding thereby causing the necessity for post-treatment and, furthermore, the cut surface tends to have a different appearance from other sections of the molding, also exhibiting the drawback that the sectional dimensions of the groove cannot be changed in a continuous manner. This invention, therefore, intends to provide a windshield molding for vehicles wherein a rainwater drainage groove with satisfactory retaining function is provided throughout the upper molding section, the molding conforming to the vehicle body panel and able to be continuously molded, and the production method thereof.

SUMMARY OF THE INVENTION

To achieve the above purpose, the windshield molding for vehicles of this invention comprises;

- an upper molding section and side molding sections to be installed along the periphery of the upper part and side parts of the windshield glass inserted into the window revealed in the vehicle body panel,
- a support leg to be inserted into the gap between the periphery of said windshield glass and the inside of said window revealed in the vehicle body panel, and
- decorative sections connected to said support leg and extending from the external end of said support leg toward the inside and outside of the window opening, to be adhered to the edges of the windshield glass and of the vehicle body panel, said upper molding section and said side molding sections of such molding being continuously molded by extrusion molding and,
- at least the decorative section of the upper molding section comprising a thick body projecting out from the outer surface of said windshield glass toward the outside of the automobile, being provided with a rainwater retaining groove facing upwards in the external edge of the projected thick body of said decorative section.

The production method of said windshield molding for vehicles of this invention is for the molding of the upper molding section and side molding sections to be installed to the periphery of the upper section and both sides of the windshield glass,

- said production method being for production by extrusion molding of a windshield molding consisting of the upper molding section and side molding sections using a die provided with an opening for extrusion molding of the decorative section to be adhered to the edges of the windshield glass and of the vehicle body panel, said die allowing extrusion-molding of the upper molding section and the side molding sections in a continuous extrusion process, and
- when molding the upper molding section, said opening for extrusion molding of said decorative section being expanded to extrude an additional thick body projection beyond the decorative section, and
- when extrusion-molding said additional thick body projection, by sending another die into the region of said expanded opening for extrusion molding at a preset timing, a rainwater retaining groove is formed in the thick body projection.

By means of said production method having said configuration, a windshield molding with less width of extension over the windshield glass surface and with an optimum rainwater drainage groove molded in the upper molding section can be extrusion-molded in a single continuous extrusion, without the necessity for additional post-processes such as cutting.

As aforementioned, by this invention, a windshield molding provided with a rainwater drainage groove with sufficient water retaining function, can be easily and satisfactorily extrusion-molded in a single continuous extrusion.

This invention can be applied to all types of windshield moldings for vehicles which are to be installed to seal the gap between the periphery of the windshield glass installed to various types of vehicles such as automobiles and the vehicle body panel, and is especially suitable for molding windshield moldings having sufficient water retaining function by extrusion only, without extra processes such as cutting being required.

EMBODIMENTS FOR CARRYING OUT OF THE INVENTION

Figure 1:
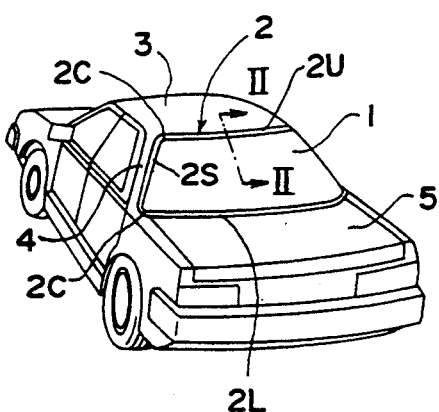
FIG. 1 is an explanatory perspective drawing showing the rear section of an automobile featuring moldings of this invention.

Referring more particularly to the exemplary embodiments of the present invention according to the drawings, as shown in FIG. 1, a windshield molding 2 consisting of an extrusion-molded lengthy sealing material is fitted to the periphery of the rear windshield glass 1 of the automobile.

The windshield molding 2 comprises the upper molding section 2U inserted into the gap between the upper edge of the windshield glass 1 and the roof panel 3, the side molding sections 2S inserted into the gap between the edges of both sides of the windshield glass 1 and the rear pillar panel 4, the lower molding section 2L inserted into the gap between the lower edge of the windshield glass 1 and the inner edge of the trunk lid panel 5 and corner molding sections 2C of bent shape positioned at the four corners formed by these four molding sections.

Figure 2:
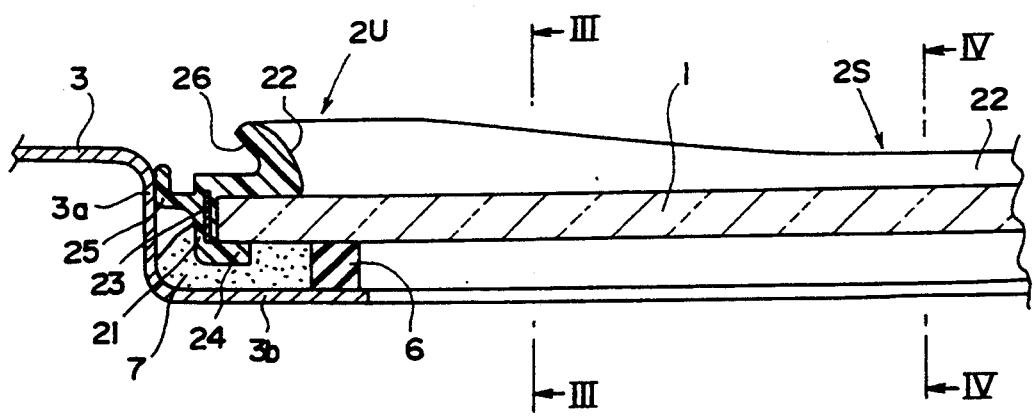
FIG. 2 is a cross-sectional view at section II—II in FIG. 1 indicating the structure of the molding as in the first embodiment of this invention.
Figure 5:
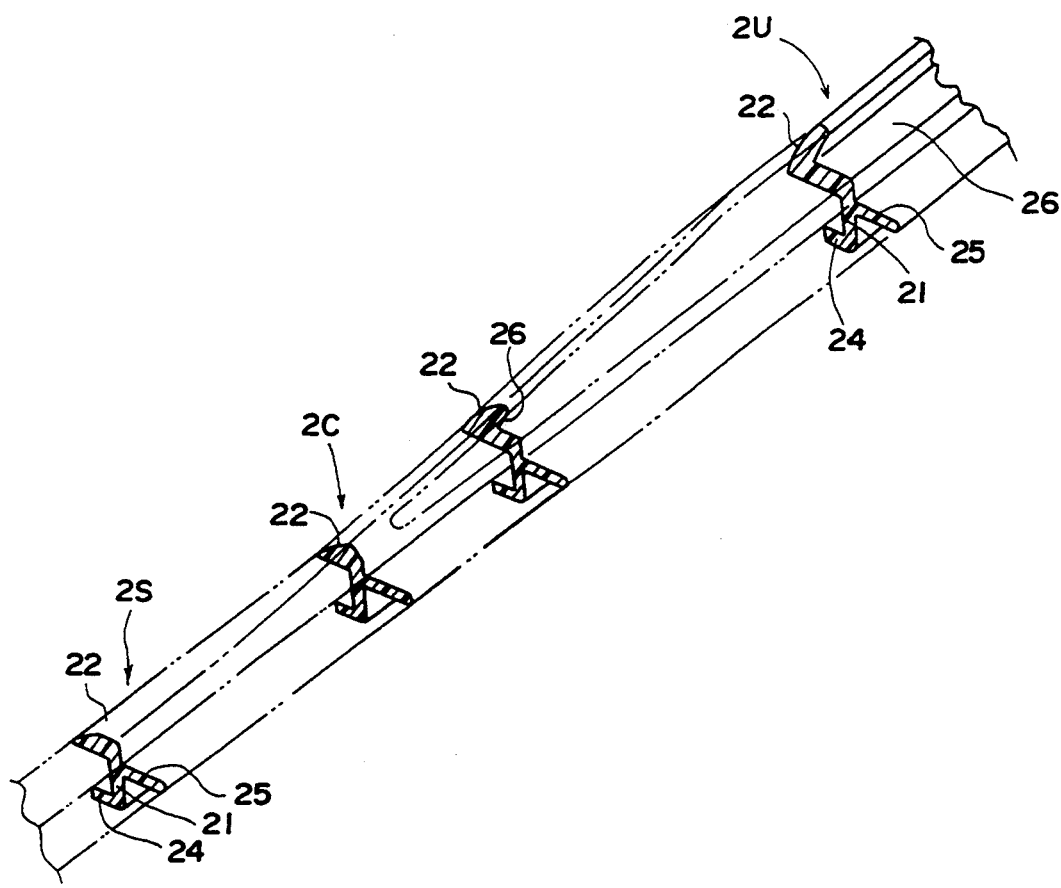
FIG. 5 is an explanatory perspective drawing indicating the appearance of the molding as is indicated in FIG. 1, immediately after completion of its extrusion molding.

The windshield molding 2 is usually made of an elastic material such as rubber or synthetic resin extrusion-molded integrally in a long length using such molding facility being described below, and as shown in FIGS. 2 and 5, the aforementioned molding sections 2U, 2C, 2S, 2C and 2L are extrusion-molded integrally and in a single continuous extrusion.

The windshield molding 2 consists of the support leg 21 to be inserted into the gap between the periphery of the windshield glass 1 and the edges of vehicle body panels 3, 4 and 5 and the decorative section 22 to overlap the position of the gap from outside (the upper side in the drawing) the vehicle body.

Each section of the windshield molding 2 has basically the same cross-sectional shape all around and, consequently, the height across the interior and exterior directions (the upper and lower directions in the drawing) of the support leg 21 is designed to be the same height all around.

A metal foil core 23 is built-in inside the support leg 21 as a supporting core material.

To the inside edge (the lower edge in the drawing) of this support leg 21, backup flange 24 to support the inner side of the windshield glass 1 and elastic lip 25 extending to contact the wall section of the vehicle body panel 3 and 4 are integrally provided all around in a single cross-sectional shape.

In addition, the decorative section 22 is positioned at the other edge of the support leg 21, toward the outside of the vehicle, (the upper side in the drawing) and consists of a lip shape projection extending to cover the exterior periphery of the windshield glass 1. A U-shaped-section groove is formed by this decorative section 22 and the backup flange 24 to held the windshield glass 1.

Also, this decorative section 22 features a thick body extending toward the outside in the area of the upper molding section, detailed explanations of this section being given below.

As shown in FIG. 5, the decorative section 22 within the region of the side molding section 2S is molded in a uniform sectional shape of a thinner body, while the decorative section 22 is gradually thickened in the body extending toward the outside (toward the upper side in the inclined sketch drawing) starting from the corner molding section 2C toward the upper molding section 2U.

Figure 4:
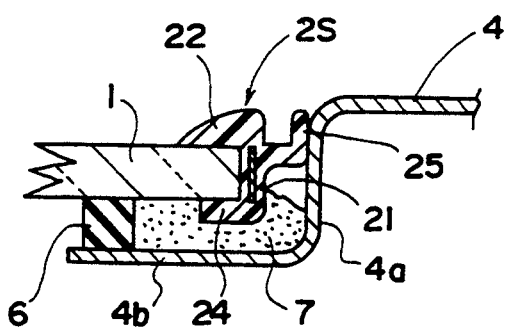
FIG. 4 is a cross-sectional view at section IV—IV in FIG. 2.

As shown in FIG. 4, the decorative section 22 is molded as a thin body lip within the region of the side molding section 2S and, consequently, the inside reach beyond the edge of the windshield glass is the shortest in this region.

Figure 3:
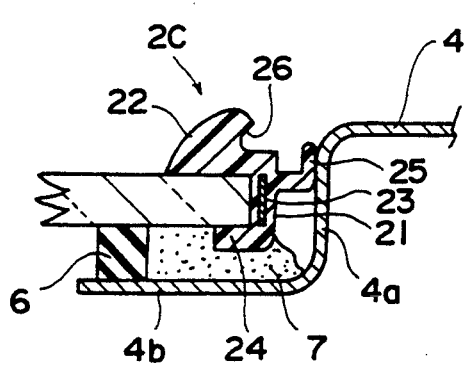
FIG. 3 is a cross-sectional view at section III—III in FIG. 2.

While the body of the decorative section 22 at a position in the side molding section 29, closer to the upper molding section, is thickened to some extent toward the outside (toward the upper side in the drawing), it also extends a little more over the edge of the windshield glass as shown in FIG. 3.

In the region of the upper mold section 2U, as shown in FIG. 2, the body of the decorative section 22 is the thickest, extending toward the outside and having the farthest inside reach beyond the edge of the windshield glass 1, such shape being maintained throughout the region of the upper molding section 2U.

The thick body section of the decorative section is so molded that the outside surface forms a twisted surface. In other words, the decorative section 22 extends toward the outside of the vehicle along the locus of a certain length of a line segment which gyrates with the segment as the radius and, consequently, the outside surface of the decorative section 22 in this region forms a twisted surface formed when said radius of gyration gyrates while said radius of gyration is moved along the longitudinal direction of the molding.

In the thickened body of the decorative section 22, the rainwater retaining groove 26 of an approximately triangular cross-sectional shape is provided facing upwards (toward the left in the drawing), or toward the roof panel 3.

The depth and width of this rainwater retaining groove 28 varies in proportion to the extent of the thickened body, or projection toward the outside, of the decorative section 22 and also to the extent of the inside reach beyond the edge of the windshield glass.

More particularly, the rainwater retaining groove 26 appears starting from a point closer to the upper molding section of the corner molding section 20 and attains its maximum cross-sectional dimensions at the starting point, connecting to the corner section, of the upper molding section 2U, such maximum cross-sectional dimensions of the groove being maintained throughout the length of the upper molding section 2U and the cross-sectional shape of the lower molding section 2L being maintained the same throughout its length.

Referring next to the mounting structure of the windshield glass 1 to the vehicle body using the windshield molding 2, the inside edge of the windshield glass opening surrounded by the roof panel 3 and the rear pillar panel 4 is bent inwards, toward the inner side of the vehicle, in a stepped shape to accept the windshield glass 1, and beyond the steps 3a or 4a, flange sections 3b and 4b are provided The height of the steps 3a and 4a is maintained the same throughout.

First, the windshield molding 2 is installed around the entire periphery of the windshield glass 1. When doing this, the edge of the windshield glass 1 within the region of the upper molding section and toward the corner molding section is inserted into the U-shaped groove formed by the backup flange 24 and the decorative section 22 of the upper molding section 2U, and the edge of the windshield glass 1 along the range of the side molding section is inserted into the U-shaped groove formed by the backup flange 24 and the decorative section 22 of the side molding section Although the corner molding section 2C is to be bent to the required curvature for installation of the windshield molding 2, as the body thickness is increased as aforementioned, non-conformities occur such as wrinkling, due to the difference in the length of the bending faces.

A dam rubber belt 6 is adhered to the surface of the flange sections 3b and 4b of said car body panels 3 and 4 and adhesive 7 is extruded to the circumference outside the dam rubber 6.

Then, the interior surface of the windshield glass to which the windshield molding 2 is installed, is pressed onto the dam rubber 6.

Then, the backup flange 24 of the windshield molding 2 is adhered by the adhesive 7, while the elastic lip 25 is inserted inside the steps 3a and 4a in bent form.

The elastic rebound force of the thus-bent elastic lip 25 works to fasten the windshield molding 2 in the required position.

Thus, the windshield glass 1 is fixed on the flange sections 3b and 4b of the vehicle body panels 3 and 4 at a uniform height throughout the periphery. Under such status, the body thickness of the decorative section 22 is uniformly maintained all around the region of the side molding sections (See FIG. 4), while the body thickness of the decorative section 22 is gradually increased in the corner molding section (See FIG. 3) and the depth and the width of the rainwater retaining groove 26 is correspondingly expanded.

At the starting point of the upper molding section extending from the end of the neighboring corner molding section, the body thickness of the decorative section 22 reaches its maximum dimension and the depth and the width of the rainwater retaining groove 28 are correspondingly increased to their maximum sizes.

The maximum body thickness and groove dimensions are maintained throughout the length of the upper molding section. (See FIG. 2)

Under the aforementioned mounting structure of the windshield glass 1 to the vehicle body, rainwater which has fallen on the roof panel 3 is prevented from flowing out over the surface of the windshield glass 1 by the rainwater retaining groove 28 and is drained via the prearranged channel.

The windshield molding 2 may be inserted onto the windshield glass 1 before installation to the window opening, or the windshield glass 1 may be installed into the window opening and the windshield molding 2 inserted into the gap between the periphery of the windshield glass I and the vehicle body panels 3 and 4.

Figure 6:
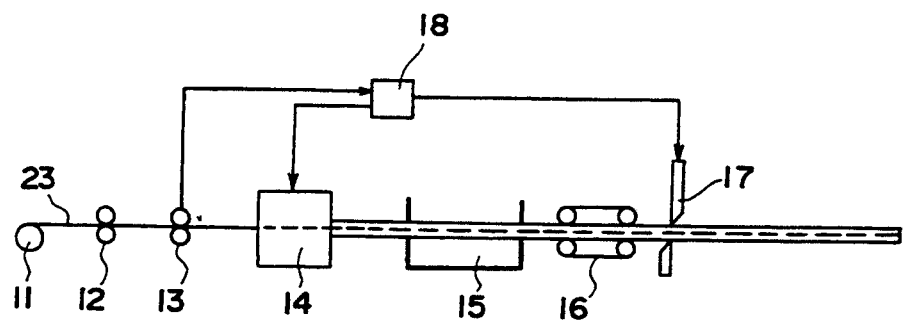
FIG. 6 is an explanatory side-view of an example of an extrusion molding facility for production of the molding as is indicated in FIGS. 1 or 5.

Referring next to the facility to mold the windshield molding 2, as shown in FIG. 6, the insert material 23 rolled out from the collet 11 is fed into the extruder 14 through the forming roller 12 and sensing roller 13, before being extruded into said cross-sectional shapes integrally with synthetic resin materials.

The extruded molding is fed through the cooling bath 15 into the cutter 17 by the drawing apparatus 18 for cutting to the prescribed length.

During the processes, the information on the feeding rate of the insert material 23 as detected by the sensing roller 13 is transferred to the controller 18 and based on such input signals, the timing of operation of the extruder 14 and cutter 17 is determined and the controller 18 accordingly outputs actuating signals to the extruder 14 and the cutter 17.

The installation position of the sensing roller 13 can be freely selected so far as the material feeding rate can be detected at said position and, for example, it may be positioned before or after the drawing apparatus 16.

Figure 7:
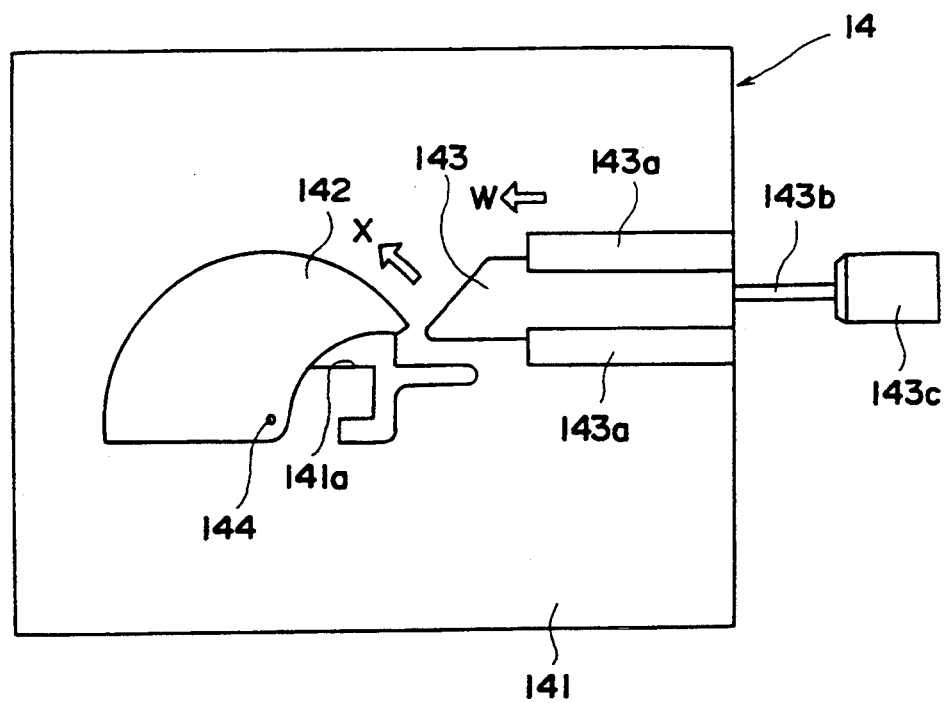
FIG. 7 is an explanatory front view indicating the extruder used in the facility as is shown in FIG. 6.
Figure 8:
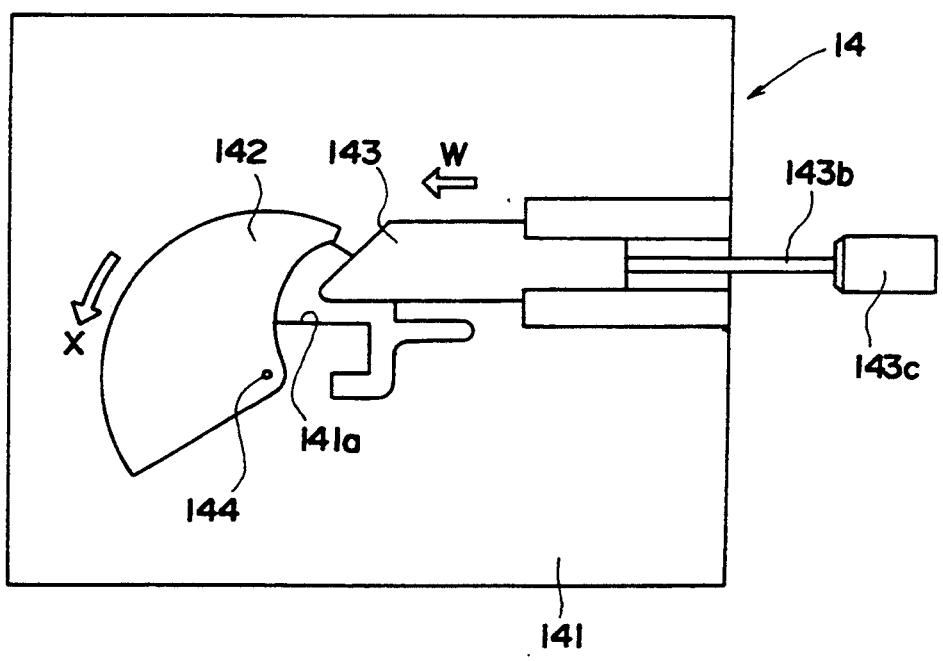
FIG. 8 is an explanatory front view indicating a moved status of the extruder as is shown in FIG. 7.

Referring now to the die used in the extruder 14, as shown in FIGS. 7 and 8, the extruder 14 is provided with three dies to form the required extrusion openings of the synthetic resin. These dies consist of the first die 141 installed in the extruding direction of the molding (the direction perpendicular to the surface of the paper on which the drawing is indicated), the second die 142 and the third die 143.

The first die 141 is installed in fixed status and is provided with the extrusion opening 141a to extrude the entire body of the windshield molding 2.

The section to extrude the decorative section 22 of this extruding opening 141a, as is particularly shown in FIG. 8, corresponds to the maximum dimensions of the thickened body and is not of a shape to form the rainwater retaining groove 26.

The second die 142 and the third die 143 are plate-shaped and are installed to the front face of the first die 141 in movable status.

The second die 142 is of a sector form, one of its edges corresponding to the sector radius, namely, the concave edge, being so designed as to form the external edge (the upper edge) of the decorative section 22. Also, the center of this second die 142 is supported by a supporting pin 144 placed below the opening for the decorative section 22 for free swiveling.

Thus, the opening for extrusion molding of the decorative section 22 may be varied by swiveling the second die 142 around the support pin 144.

The third die 143 is so supported by a pair of guides 143a & 143a that it may slide in parallel with the direction of said guides 143a & 143a.

At the far right of the drawing of the third die 143, a connecting rod 143b is attached which is connected to the drive motor 143c through a converter which converts rotary motion to linear motion.

The third die 143 is reciprocally moved between the position to form the opening for extrusion of the side molding section as shown in FIG. 7 and the position to form the opening for extrusion of the upper molding section as shown in FIG. 8, by the driving force of this drive motor 143c.

The left top end in the drawing of the third die 143 forms a masking portion of triangular shape corresponding to the rainwater retaining groove 26 of the windshield molding 2.

This masking portion of the third die 143 is so positioned that it may enter the portion to form the decorative section 22 of the extrusion opening in the first die 141.

The masking portion is reciprocally moved in the horizontal direction interlocking with the reciprocal rotary movement of the second die 142 as shown in FIGS. 7 and 8.

Referring then to the extrusion molding method of the windshield molding 2 using said extrusion molding facility, when molding the windshield molding 2, the upper molding section 2U, the corner molding section 2C, the side molding section 28 and the lower molding section 2L are extrusion-molded continuously, such molding to be performed in the order of, a side molding section 28, the corner molding 2C, the upper molding 2U, the other side molding section 2S and the lower molding section 2L.

When extrusion molding the side molding section 2S, the second die 142 and the third die 143 are positioned in relation to the first die 141, as shown in the drawing, and to the extrusion molding opening 141a of the first die 141, band-shaped metal film core material is fed into the position corresponding to the support leg 21 section.

The extrusion molding is started from the low end portion of the side molding section (the right side in FIG. 2) and the side molding section 28 of the cross-sectional shape as shown in FIG. 4 is extruded. During this process, the decorative section 22 is of a thin flat body lip shape of less width and the rainwater retaining groove 26 is not formed.

On completion of extrusion to the prescribed length and in the same cross-sectional shape as the side molding section 2S, the corner molding section 2C is successively extruded. At this moment, the second die 142 starts swiveling toward the X-direction.

Thus, the portion of the opening corresponding to the decorative section 22 of the overall extrusion opening 141a in the first die 141 is gradually enlarged and the thickness of the body of the decorative section 22 increases correspondingly.

Also, proportionally to the expansion of the body thickness of the decorative section 22, the third die 143 is advanced toward the W-direction.

At the moment when the third die 143 moves into the extrusion opening 141a in the first die 141, the rainwater retaining groove 26 starts being formed in the thickened body portion of the decorative section 22.

When the extrusion process of this corner molding section 2C is completed, is shown in FIG. 8, the second die 142 is swiveled to the maximum, at which time the extrusion of the upper molding section 2U of the maximum body thickness is started. At this time, the third die 143 is advanced to the maximum stroke as against the extrusion opening 141a in the first die 141, thus forming the rainwater retaining groove 26 of the maximum cross-sectional depth and width in the thickened body of the upper molding section 2U.

The upper molding section 2U is then extrusion-molded to the same cross-sectional shape throughout the prescribed length.

When extrusion molding of the upper molding section 2U to the prescribed length is completed, in the reverse order of the aforesaid processes, the corner molding section 2C and the side molding section 2S are extruded before the lower molding section 2L is extrusion-molded in a certain cross-sectional shape, thus completing molding of a complete set of windshield molding 2.

If the masking portion of the third die 143 is made to a more acute angle, the rainwater retaining groove may be formed in the corner molding section starting from a lesser body thickness point.

Figure 9:
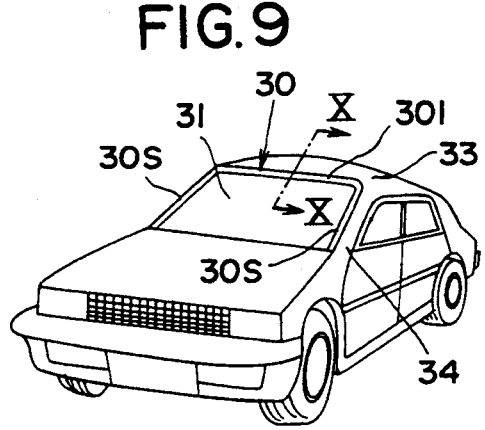
FIG. 9 is an explanatory perspective drawing showing the front section of an automobile featuring the molding as in the second embodiment of this invention.
Figure 11:
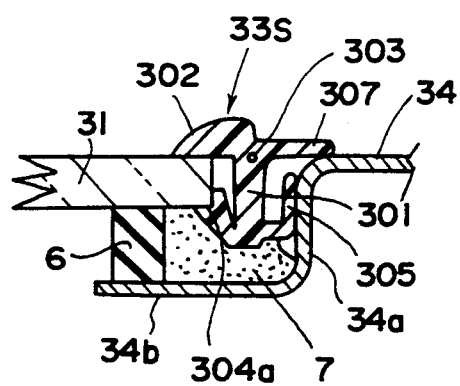
FIG. 11 is a cross-sectional view at section XI—XI in FIG. 10.

The windshield molding 30 as shown in FIGS. 9 and 11 is of another embodiment of this invention which is to be installed to the periphery of the front windshield glass 31 wherein at the external end (the upper end in the drawing) of the support leg 301, the decorative section 302 and the upper elastic lip 307 are integrally provided, while at the internal end (the lower end in the drawing) of the support leg 301, the backup flange 304 and the lower elastic lip 305 are integrally formed throughout the length.

The decorative section 302 is attached to the outer surface of the windshield glass 31 and is provided with a extending thick body portion and rainwater retaining groove 306, similar to those of the molding of the aforementioned embodiment, for the entire length of the upper molding section.

Figure 10:
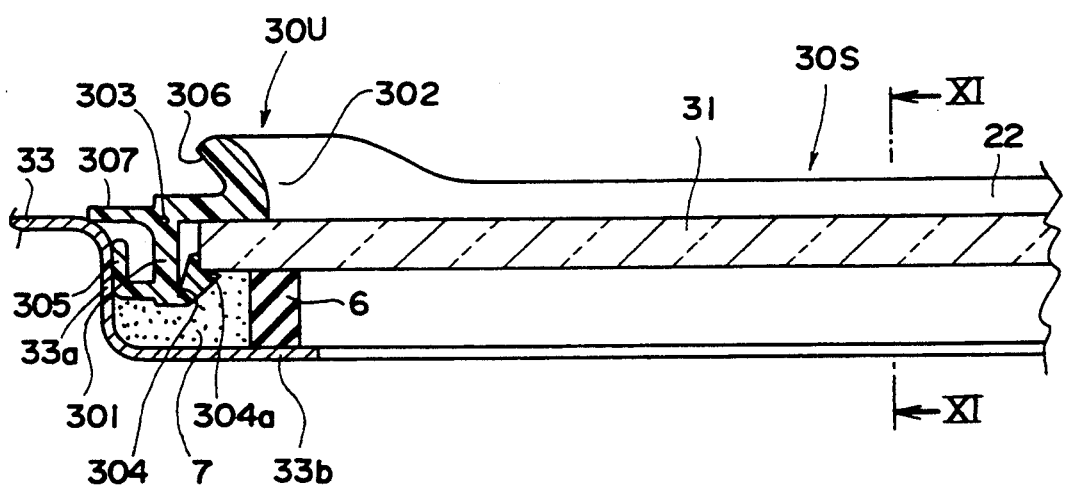
FIG. 10 is a cross-sectional view at section X—X in FIG. 9.

As shown in FIG. 10, the decorative section 302 of the upper molding section 30U is molded in cross-sectional shape of increased thickness and width, and the rainwater retaining groove 306 of a triangular cross-sectional shape is formed in said thickened and widened body portion.

Also, the side molding 30S, as shown in FIG. 11, is provided with the decorative section 302 of less thickness and less width and of uniform cross-sectional shape through its entire length.

The upper elastic lip 307 is attached to the outer surface of the roof panel 33 and the front pillar panel The upper elastic lip 307 is molded in a uniform cross-sectional shape throughout its entire length and the thickness toward the internal and external sides of the vehicle (the upper and lower direction in the remains the same throughout the entire length.

At the top end of the support leg 304, fitting recess 304a is formed to which the internal edge of the windshield glass is fitted, and the top end of the lower elastic lip 305 is inserted in bent status against the inclined wall 33a & 34a of the roof panel 33 and front pillar panel 34.

Furthermore, in the connecting section of the support leg 301 and the decorative section 302, a wire core 303 is inlaid throughout the entire length.

With the second embodiment as described above, similar functions and effects to the aforementioned embodiment may be obtained. Also, with these embodiments, the windshield molding and the windshield glass already previously attached may be inserted into the window frame, or, the support leg of the windshield molding may be inserted into the gap between the periphery of the windshield glass and the vehicle body panel, the windshield glass being already fitted to the window frame in advance.

Figure 12:
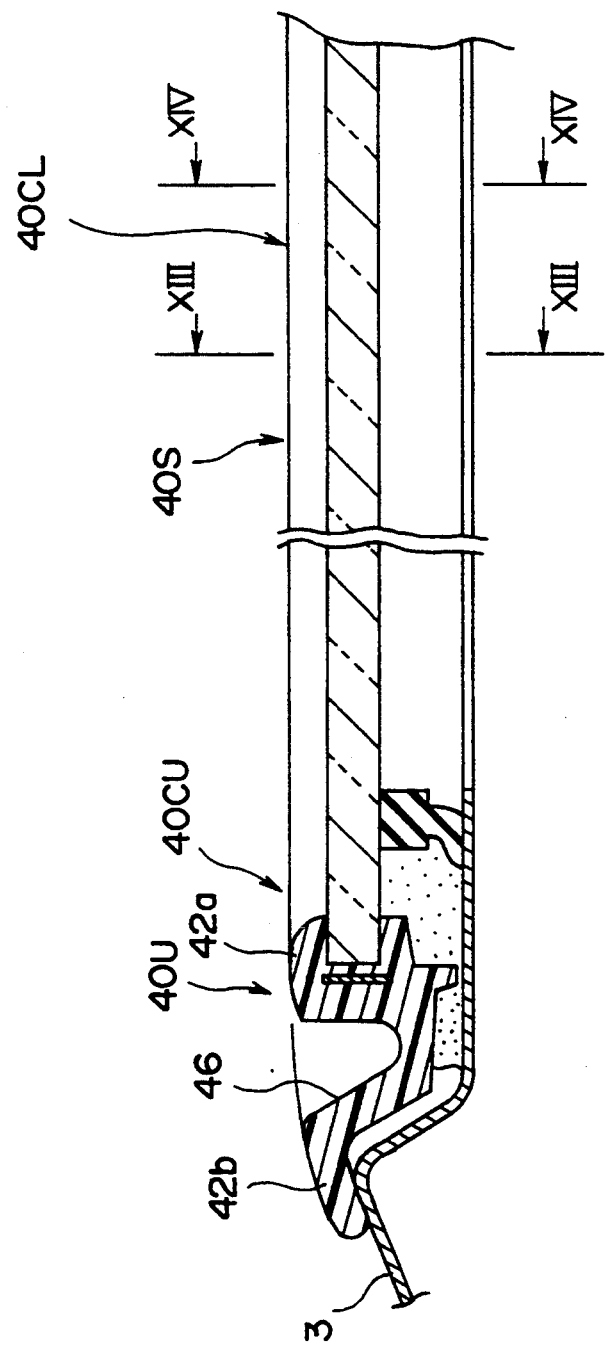
FIG. 12 is a cross-sectional view corresponding to FIG. 2, indicating the inserted status of the upper section of the rear windshield molding of the third embodiment of this invention.
Figure 13:
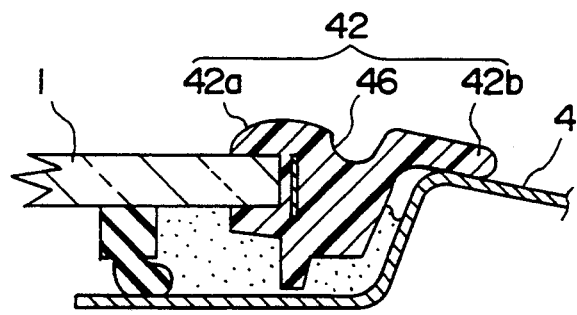
FIG. 13 is a cross-sectional view at section XIII—XIII in FIG. 12.
Figure 14:
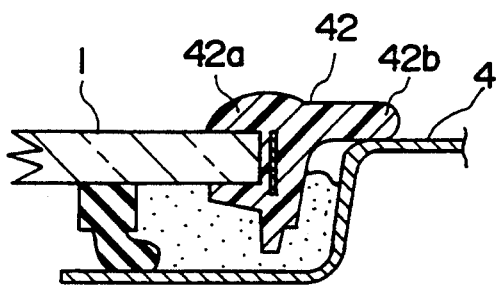
FIG. 14 is a cross-sectional view at section XIV—XIV in FIG. 12.
Figure 15:
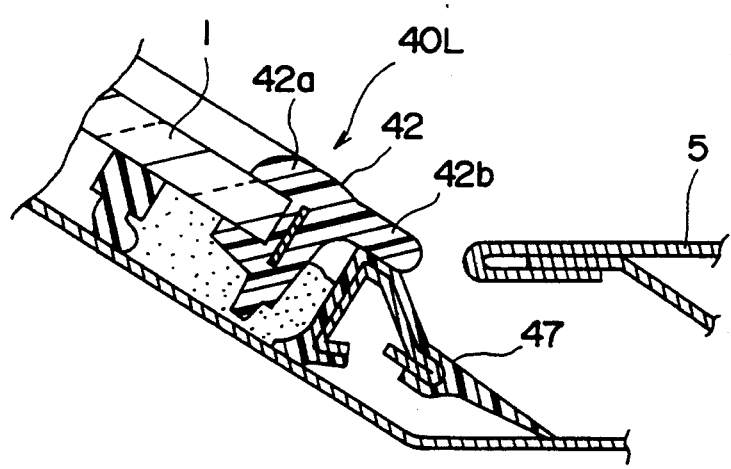
FIG. 15 is a cross-sectional view corresponding to FIG. 2, indicating the inserted status of the lower section of the rear windshield molding of the third embodiment of this invention.

The rear windshield molding 40 of the embodiment shown in FIGS. 12 to 15 is integrally comprised of the upper molding section 40U, the upper-corner molding sections 40CU, the side molding sections 40S, the lower-corner molding sections 40CL and the lower molding section 40L. Among these sections, the upper molding section 40U, the upper-corner molding sections 40CU and the side molding sections 40S are molded in a uniform cross-sectional shape as shown in FIG. 12, while the lower molding section 40L is molded in another cross-sectional shape, as shown in FIG. 15, being uniform throughout its length.

Said upper molding section 40U, upper-corner molding sections 40CU and side molding sections 40S are inserted into the gap occurring between the vehicle body panels 3 and 4 and the windshield glass 1.

The decorative section 42 consists of the outer side decorative section 42b and the inner side decorative section 42a, said outer side decorative section 42b comprising a thick body extending toward the outside.

In this thick body portion of the outer side decorative section 42b, a rainwater retaining groove 46 having a triangular-like cross-sectional shape is provided facing the upper outward side of the vehicle body (the upper side of the drawing).

While the lower molding section 40L is inserted between a fastening trim 47 fixed to clips which are omitted from the drawing and the windshield glass 1, no rainwater retaining groove is provided in this lower molding section 40L, to prevent rainwater from being retained in the lower molding section 40L.

Conversely, the lower-corner molding sections 40CL are of varying cross-sectional shape from the portion nearest the side molding section toward the portion nearest the lower molding section as shown in FIGS. 13 and 14. As shown in FIG. 13, at the portion connecting to the lower end of the side molding 40S, the outer side decorative section 42b of the decorative section 42 is comparatively less in width and of thinner body, and in proportion to the extent that the depth and width of the rainwater retaining groove 46 are also reduced.

At the portion connecting to the lower molding section 40L of the lower-corner molding section 40CL, as shown in FIG. 14, the rainwater retaining groove disappears and the cross-sectional shape becomes the same as that of the lower molding 40L.

Figure 16:
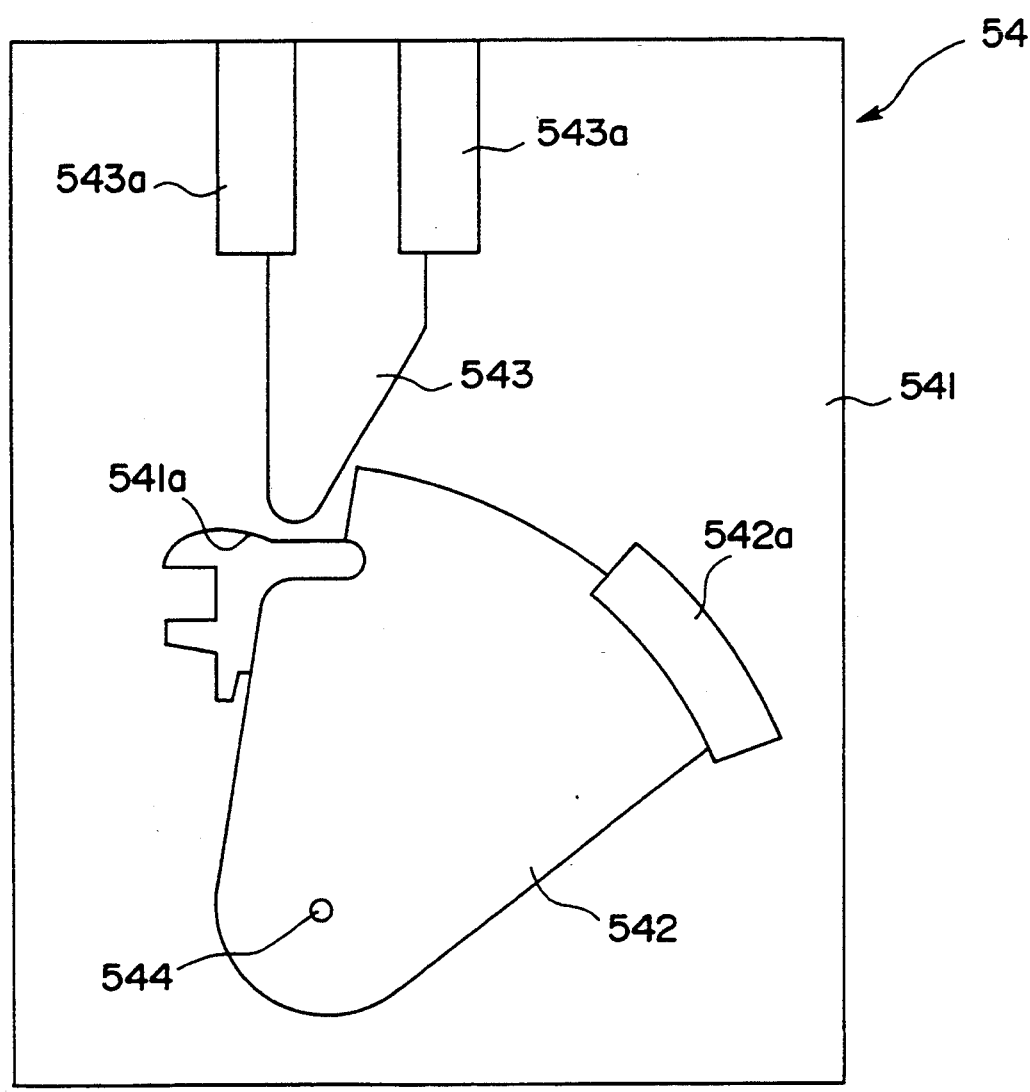
FIG. 16 is a front view of the extrusion molding die for the rear windshield molding of the third embodiment of this invention.
Figure 17:
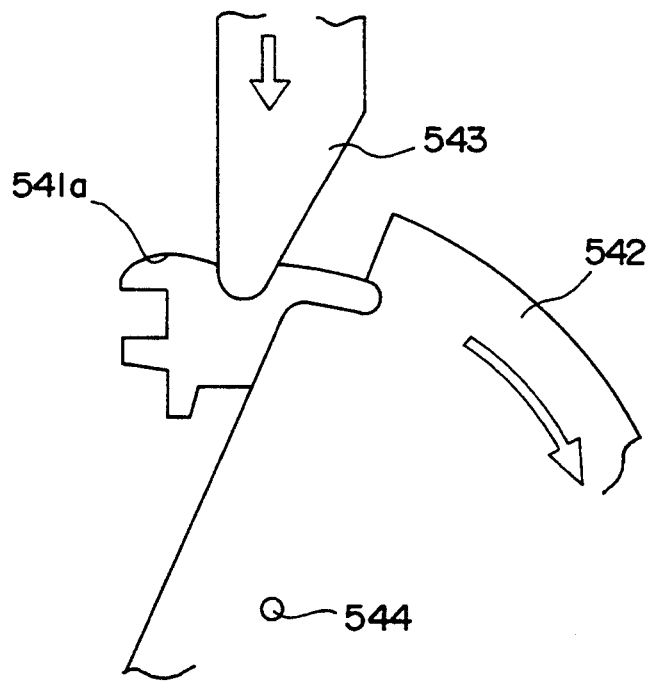
FIG. 17 is a front view showing the moving status of the second and the third dies in the extrusion molding die as is indicated in FIG. 16.
Figure 18:
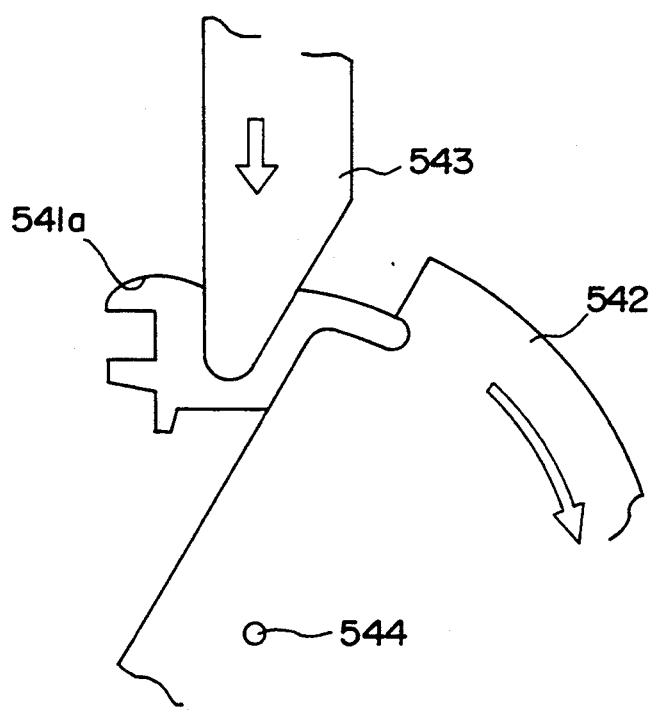
FIG. 18 is a front view showing the further moved status of the second and the third dies in the extrusion molding die as is indicated in FIG. 16.

Referring to the die employed to mold the windshield molding 40, as shown in FIGS. 16 to 18, the first die 541 of the molding die 54 features the extrusion molding opening 541a corresponding to the overall cross-sectional shape of the windshield molding 40.

The second die 542 is of a sector form, one of its sides corresponding to the radius of the sector, the left one in FIG. 16, being so positioned over the extrusion molding opening 541a as to form the external edge of the outer side decorative section 42b of the decorative section 42.

Also, the center of this second die 542 of sector form is supported by a supporting pin 544 for free-swiveling around the supporting pin 544 along the guide 542a and by swiveling the die 542, the extrusion molding opening varies in the portion which forms the outer side decorative section 42a of the decorative section 42.

The third die 543 is so supported by a pair of guides 543a that it may slide in parallel with the direction of the guides 543a, In the vertical direction in the drawing. The top end, the lower end in the drawing, of the third die 543 is made into a masking portion of triangular shape corresponding to the cross-section of the rainwater retaining groove 46 of the windshield molding 40.

This masking portion of the third die 543 is so positioned as to enter into the central part to form the decorative section 42 of the extrusion molding opening 541a in the first die 541, from the upper side in the drawing or from the upper outward side of the vehicle body.

Referring then to the extrusion molding method of the windshield molding 40 using said extrusion molding facility, the windshield molding 40 is extrusion-molded in the order of the lower molding section 40L, the lower-corner molding section 40CL, the side molding section 40S, the upper-corner molding section 40CU, the upper molding section 40U, the upper corner molding 40CU, the side molding 40S, the lower-corner molding 40CL and the lower molding 40L. The lower molding section 40L first mentioned above and that last mentioned, are connected together at their approximate center points by heat welding, etc.

When extrusion molding the lower molding 40L, the first die 541, the second die 542 and the third die 543 are positioned as shown in FIG. 16 and the lower molding section 40L is extrusion-molded to a prescribed length.

Then, the second die 542 starts swiveling toward the open side and extrusion molding of the lower-corner molding section 40CL commences, the lower-corner molding section 40CL integrally following the lower molding section 40L.

When this second die 542 swivels toward the open side, the extrusion molding opening in the first die 541 is gradually expanded, thereby gradually increasing the body thickness of the outer side decorative section 42b of the decorative section 42 toward the outside, thus forming the extended thick body portion. At this time, as shown in FIG. 17, the third die 543 moves toward the lower side in the drawing in proportion to the thickness increase in the outer side decorative section 42a of the decorative section 42 and the top end of the third die 543 starts forming the rainwater retaining groove 46 in the thick body section of the decorative section 42.

At the time when the molding of the lower-corner molding 40CL is completed, the second die 542 is at the maximum open state and the third die 543 is also at the far end of its forward stroke.

From this point, with the opening fixed at said maximum status, extrusion molding proceeds in the order of the side molding section 40S, the upper-corner molding section 40CL, the upper molding section 40U, the upper-corner molding section 40CU and the side molding section 40S, before proceeding to extrusion-molding of the lower-corner molding 40CL wherein the second die 542 and the third die 543 gradually move back in the reverse direction.

What is claimed are:

1. A windshield molding for vehicles, the windshield molding comprising a first molding section and a second molding section which are continuously and integrally extrusion-molded for installation along a periphery of a windshield glass fixed to a window opening in a vehicle body panel; wherein:

said first molding section and said second molding section include a support leg section adapted for insertion into a gap between the periphery of said windshield glass and an inner edge of said window opening, and a decorative section positioned at an external end of said support leg to overlap said periphery of said windshield glass from an outside;

at least one part of said decorative section and said support leg section has a thick body portion which is gradually thickened in a longitudinal direction at least in the first molding section and extends in an external direction from a peripheral edge of a surface of the windshield glass; and said thick body portion has a rainwater retaining groove formed therein for retaining rainwater.

2. A windshield molding for vehicles, the windshield molding comprising a first molding section and a second molding section which are continuously and integrally extrusion-molded for installation along a periphery of a windshield glass fixed to a window opening in a vehicle body panel; wherein:

said first molding section and said second molding section include a support leg section adapted for installation to the periphery of said windshield glass, and a decorative section positioned at an external end of said support leg to overlap the periphery of said windshield glass;

a thick body portion is formed by said decorative section which gradually increases with distance from said support leg section at least in the first molding section; and said thick body portion has a rainwater retaining groove formed therein for retaining rainwater.

3. A windshield molding for vehicles, the windshield molding comprising a first molding section and a second molding section which are continuously and integrally extrusion-molded for installation along a periphery of a windshield glass fixed to a window opening in a vehicle body panel; wherein:

said first molding section and said second molding section include an inner decorative section positioned to overlap the periphery of said windshield glass, and a outer decorative section positioned to overlap the periphery of said window opening;

a thick body portion is formed between said inner decorative section and outer decorative section by both decorative sections and gradually increases with distance from each other at least in the first molding section; and said thick body portion has a rainwater retaining groove formed therein for retaining rainwater.

4. A windshield molding according to claim 1, wherein:

said decorative section has said thick body portion; and said rainwater retaining groove opens toward an outer side of the peripheral edge of the windshield glass.

5. A windshield molding according to claim 1, wherein:

said decorative section and said support leg section have said thick body portion; and said rainwater retaining groove opens toward an external direction of the vehicle.

6. A windshield molding according to one of claims 1, 2 or 3, wherein said first molding section corresponds to an upper periphery of the windshield glass and said second molding section corresponds to a side periphery of the windshield glass.

7. A windshield molding according to one of claims 1, 2 or 3, wherein said first molding section corresponds to an upper and side periphery of the windshield glass and said second molding section corresponds to a lower periphery of the windshield glass.

8. A windshield molding according to one of claims 1, 2 or 3, wherein a depth and a width of said rainwater retaining groove varies gradually in proportion to an extent of the decorative section.

9. A windshield molding according to one of claims 1 or 2, wherein an elastic lip is provided to said support leg section.

10. A windshield molding according to claim 1, wherein a backup flange which fits to an inner side of the windshield glass is provided to said support leg section.

11. A windshield molding according to claim 3, wherein said first molding section and said second molding section include a support leg section which fits to an inner side of the windshield glass.

12. A windshield molding according to one of claims 1, 2 or 3, wherein said rainwater retaining groove is adapted to retain rainwater which flows from the body panel.

* * * * *